(12) United States Patent
Ammi et al.

(10) Patent No.: US 7,366,507 B2
(45) Date of Patent: Apr. 29, 2008

(54) METHOD AND SYSTEM FOR EVALUATING UPLINK INTER-CELL INTERFERENCE

(75) Inventors: Lionel Ammi, Les Ulis (FR); Mylène Pischella, Paris (FR)

(73) Assignee: France Telecom, Paris (FR)

( * ) Notice: Subject to any disclaimer, the term of this patent is extended or adjusted under 35 U.S.C. 154(b) by 384 days.

(21) Appl. No.: 10/923,283

(22) Filed: Aug. 20, 2004

(65) Prior Publication Data

US 2005/0090244 A1   Apr. 28, 2005

(30) Foreign Application Priority Data

Aug. 21, 2003 (EP) ................... 03292066

(51) Int. Cl.
*H04Q 7/20* (2006.01)
(52) U.S. Cl. ............... 455/423; 455/63.1; 455/67.13; 455/67.11
(58) Field of Classification Search ............ 455/63.1, 455/67.13, 67.11, 423
See application file for complete search history.

(56) References Cited

U.S. PATENT DOCUMENTS 6,512,933 B1 * 1/2003 Kalofonos et al. .......... 455/522
6,810,246 B1 * 10/2004 Kalofonos et al. .......... 455/423

FOREIGN PATENT DOCUMENTS

EP    1 292 162 A1    9/2001

* cited by examiner

*Primary Examiner*—Lester G. Kincaid
*Assistant Examiner*—Charles Shedrick
(74) *Attorney, Agent, or Firm*—Cohen Pontani Lieberman & Pavane LLP

(57) ABSTRACT

Uplink inter-cell interference is evaluated by allocating positions to mobiles in the cell of interest ($C_0$) and in interfering cells, computing a value for inter-cell interference for this position, re-positioning the mobiles, and re-computing the inter-cell interference value, until the calculated inter-cell interference converges on a stable value. At each iteration, the interfering mobiles are allocated a positional distribution within their respective cells which is an image of the distribution used for the mobiles in the cell of interest. Power control is performed only for mobiles in the studied cell, and the assigned distribution of power values is also allocated to the mobiles in the interfering cells. An inter-cell interference evaluation system (10) includes a mobile-communication-unit positioning module (20), a path loss computation module (30), a power control module (50) and an inter-cell interference computation module (70), operating under the control of a controller (80).

21 Claims, 5 Drawing Sheets cells/sectors base stations
(trisectorised)

↑ Antenna direction
○ Mobile of service A
● Mobile of service B
◉ Mobile of service C
◎ Mobile of service D ↑ Antenna direction
○ Mobile of service A
● Mobile of service B
◉ Mobile of service C
◎ Mobile of service D

METHOD AND SYSTEM FOR EVALUATING UPLINK INTER-CELL INTERFERENCE

BACKGROUND OF THE INVENTION

1. Field of the Invention

The present invention relates to the field of mobile communications systems. More particularly, the present invention relates to the calculation of inter-cell interference in a cellular mobile communications system.

Universal Mobile Telecommunication Services (UTMS) are being developed, in which voice and data signals are transmitted using a Wideband Code Division Multiple Access (WCDMA) transmission method. One or more services may be provided in the network, for example, a voice-only service, a data-only service, and a mixed voice/data service. In general, UTMS networks are cellular networks based on a system of hexagonal regions each having its own base station for handling transmission to/from mobile communications units (mobiles) in the cells of that region. Typically, each hexagonal region is divided into three sectors (cells) and has six nearest neighbors (see FIG. 1).

The maximum capacity of a WCDMA system is determined, at least in part, by the interference that occurs at a base station's antenna between signals received from mobiles in the cell of interest and signals received from mobiles in other cells. Accordingly, it is useful to be able to evaluate this forward-link, or uplink, inter-cell interference in order to be able to estimate system capacity (as well as other parameters). (Of course, uplink intra-cell interference also affects the studied cell, but the present invention is primarily concerned with evaluation of uplink inter-cell interference).

2. Description of the Related Art

Typically, uplink inter-cell interference is calculated at a base station $BS_0$ for an antenna serving one of its sectors, cell $C_0$, and is equal to the sum of received powers (that is power received at this base station antenna) coming from mobiles of other cells $C_1, C_2, \ldots C_q$. Usually, calculations of uplink inter-cell interference assume that interference comes from cells served by base stations arranged in two rings around the base station serving the cell of interest (interfering cells of only one ring of "nearest-neighbor" base stations are shown in FIG. 1). Up to now, three different approaches have been adopted for evaluating uplink inter-cell interference.

A first known approach assumes that uplink inter-cell interference will be some fraction, f, of the intra-cell interference (this intra-cell interference is the sum of all received powers coming from other mobiles in the same cell as the mobile of interest). In order to find a value to assign to this fraction, f, either analytical studies or system simulations are performed.

Because this first approach requires as an input a value for the fraction, f, it does not allow inter-cell interference to be evaluated independently of previous computations. Moreover, a value for the fraction, f, is only known for a limited number of system configurations.

A second known approach computes uplink inter-cell interference based on system simulations. These require simulation not only of the mobiles within the cell of interest (and their power values) but also of the mobiles in neighboring cells which may generate an appreciable amount of interference.

Because this second known approach requires modeling of large numbers of mobiles, the computation complexity is very high, especially when considering power control.

A third known approach simplifies calculations by treating all mobiles of a given service within a cell as contributing to a uniform distribution of traffic over the cell, rather than treating each mobile as a discrete unit. Uplink inter-cell interference is then determined by numerical integration over the surface of the cells neighboring the cell of interest.

This third approach is based on an assumption that all mobiles for one service are received with the same power in their respective cell. However, in reality mobiles have limited range. Moreover, the complexity of this evaluation method increases with the number of services being taken into account simultaneously.

SUMMARY OF THE INVENTION

The preferred embodiments of the present invention provide a method of evaluating uplink inter-cell interference whatever the configuration of the studied cell.

The preferred embodiments of the present invention only model power control for mobiles of the studied cell and so the calculation complexity is significantly reduced compared to methods involving system simulations. Also, in the preferred embodiments the power control calculations take into account the power limitations of the mobiles. The method's complexity is independent of the number of services operating in the cell.

More especially, the present invention provides a method of evaluating uplink inter-cell interference affecting mobile communications units in a first cell of a cellular mobile communications system, said cellular mobile communications system comprising mobile communications units in a second set of cells susceptible of causing interference affecting said mobile communications units in said first cell, the method comprising the steps of:

a) allocating positions of mobile communications units within said first cell;

b) allocating positions of mobile communications units within said second cells;

c) calculating a value for uplink inter-cell interference applicable to said mobile communications units in said first cell based on the mobile communications unit positions allocated, in the allocating steps, to mobile communications units of said first and second cells;

d) repeating steps a) to c) for different positions of the mobile communications units, until a first predetermined criterion is satisfied; and e) determining, as the value of uplink inter-cell interference, a value representative of the set of values calculated in step c).

In the preferred embodiments of the invention, the determining step determines, as the value of uplink inter-cell interference, the mean of the values calculated in step c). However, other values may be used, for example, the median of the values calculated in step c).

The method of the present invention typically finds application in CDMA and WCDMA networks, in which the mobile communications units of all cells operate at the same frequency.

Preferably, steps a) to c) are repeated either until there is a sufficient degree of convergence (measured, for example, by determining when the ratio of the standard deviation of the inter-cell interference values calculated in the different occurrences of step c) to the mean of said inter-cell interference values is less than a threshold amount), or there has been a predetermined number of repetitions of steps a) to c)).

Advantageously, according to the present invention, the mobiles in the second set of cells are in the same positions relative to their respective cells as the mobiles in the first cell.

In the case of a cellular network in which each cell corresponds to one sector of a base station serving a number of sectors, the method preferably includes the step of first allocating positions to the mobiles within one sector of the first base station, $BS_0$, and then allocating positions to the mobiles in the other sectors of the same base station by rotation of the positions of the mobile communications units in the first sector (cell $C_0$).

According to the preferred embodiments of the invention, the method also includes the step of determining path loss from the interfering mobiles to the relevant antenna of the base station serving the first cell.

In the preferred embodiments of the invention, when calculating a value for inter-cell interference applicable to a given set of positions for the mobiles, the following procedure is used: Transmission power values are allocated to the mobiles, then a value is calculated for inter-cell interference, then transmission power values are re-calculated based on the calculated inter-cell interference value, then the inter-cell interference value is re-calculated based on the new transmission power values, and so on, until the calculated inter-cell interference value converges on a steady value, or a predetermined number of iterations has taken place.

In the preferred embodiments of the invention power control is performed only for the mobiles in the first cell, and then transmission power values for the interfering mobiles are allocated based on the values assigned to the mobiles in the first cell. Advantageously, when performing power control for the mobiles of the first cell, the following procedure is followed: first a value is found for the total uplink interference experienced by these mobiles (assuming that they will all achieve their desired signal-to-interference ratios), then transmission-power values are allocated for these mobiles (within a permitted range $P_{min}$ to $P_{max}$, with power limitation if necessary), based on the determined value of total uplink interference; then a new value of said total uplink interference is calculated, based on the allocated transmission power values, then the transmission power values are re-calculated, and so on until either the change in total uplink interference from one iteration to the next is less than a specified fraction of the preceding total uplink interference value or there has been a predetermined number of iterations.

The present invention also provides an inter-cell interference evaluation system for performing the above-described method. The system may be implemented in hardware, software, or a combination of the two. More especially, the system may consist of a general-purpose computer or processor, running a suitable computer program.

The present invention further provides a computer program which, when programmed on a general-purpose computer (or processor), causes the computer to perform the above-described method.

The present invention still further provides a data carrier bearing the above-described computer program.

The above and further objects, features and advantages of the present invention will become clear from the following description of preferred embodiments thereof, given by way of example, illustrated with reference to the accompanying drawings, in which:

DESCRIPTION OF THE PREFERRED EMBODIMENT

Figure 1:
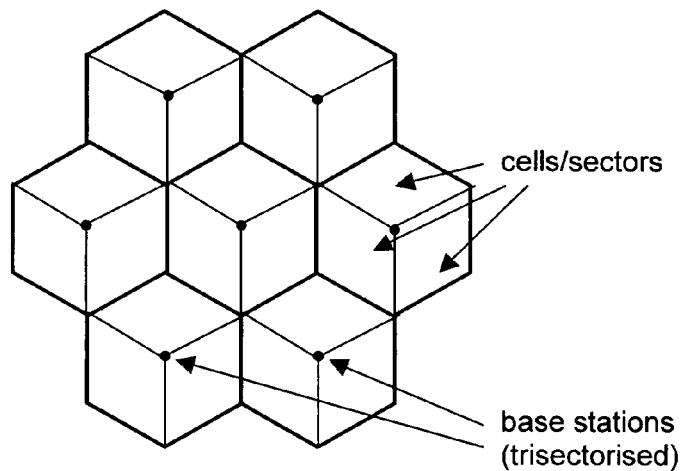
FIG. 1 is a diagram illustrating the cellular structure of a typical network in which the present invention may be applied.
Figure 2:
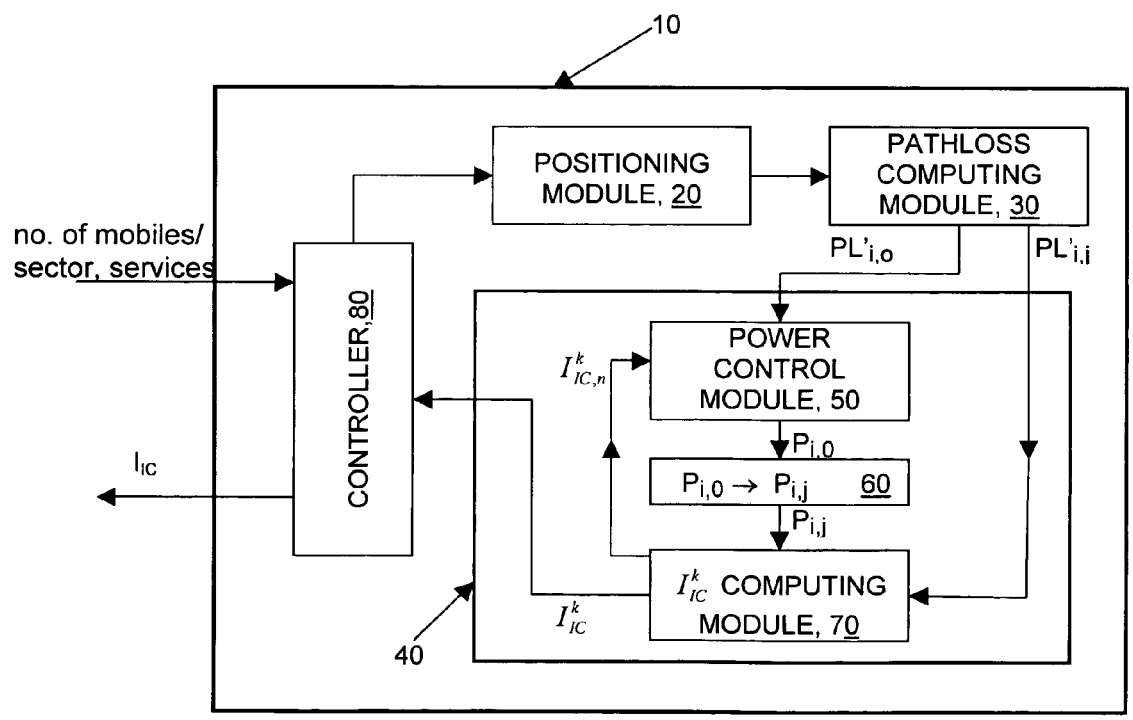
FIG. 2 is a block diagram illustrating the main components of an uplink inter-cell interference calculating system according to a preferred embodiment of the present invention.
Figure 3:
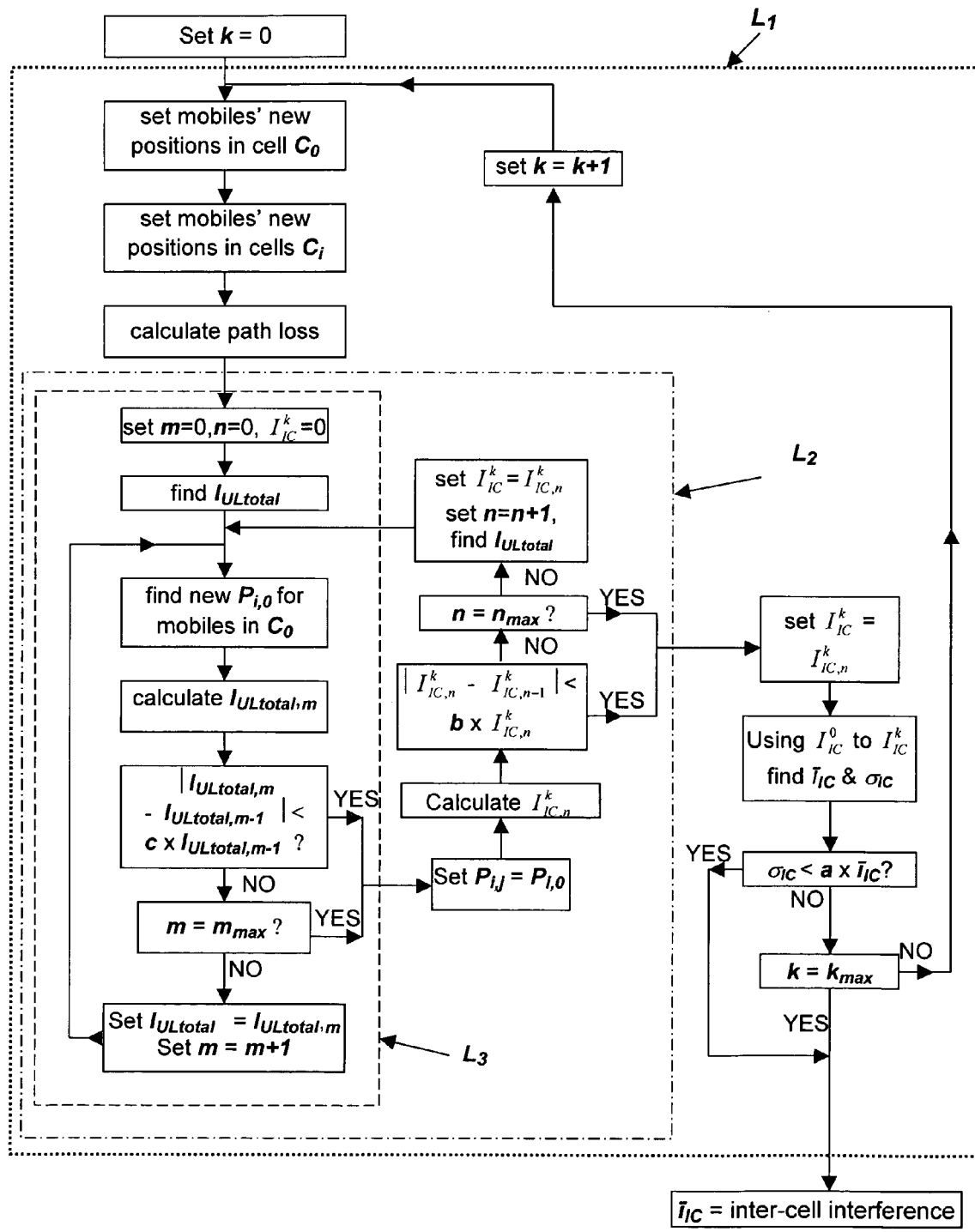
FIG. 3 is a flow diagram illustrating the main steps in the global method implemented by the system of FIG. 2.

An overview of the global system and method for evaluating inter-cell interference according to the preferred embodiment of the present invention will now be described with reference to FIGS. 2 and 3. FIG. 2 illustrates the main components of an inter-cell interference evaluation system 10 according to the preferred embodiment of the invention. FIG. 3 is a flow diagram indicating the main steps of the inter-cell interference evaluation method according to the preferred embodiment of the invention.

In the following description, it is assumed that the cellular network under study is based on tri-sectored base stations each serving a hexagonal region. However, it is to be understood that the invention is not limited with reference to the shape of the cells or regions, or the number of sectors per base station.

Further, in the following description inter-cell interference will be evaluated for a cell $C_0$ and it is assumed that this "inter-cell interference" comes from mobiles in cells, $C_i$, served by the same base station, $BS_0$, and by two rings of "nearest-neighbor" base stations, $BS_i$. However, it is to be understood that the invention is not limited with reference to the number of rings of base stations which are taken into account.

As indicated in FIG. 2, the inter-cell interference evaluation system 10 according to the preferred embodiment of the invention includes a positioning module 20 for allocating positions to the mobiles in the studied cell, $C_0$, and to the mobiles in the interfering cells, $C_i$.

The positioning module 20 allocates a first set of positions (k=0) to the mobiles in the cells $C_0$, $C_i$, and then an inter-cell interference value $I_{IC}^0$ is calculated for the cell of interest, $C_0$, by a calculation module 40, based on these positions that have been allocated to the mobiles. A path loss computing unit 30 is provided in the system so that the calculation of inter-cell interference for a given set of positions of the mobiles takes into account the range of each mobile, its distance from, and angle with respect to, the base station antenna of the cell of interest.

Once an inter-cell interference value $I_{IC}^0$ has been calculated by the calculation unit 40 for a first set of positions (k=0), then the positioning module 20 allocates a second set of positions (k=1) to the mobiles in the cells $C_0$, $C_i$, based on the same total number of mobiles per cell (having the same probability density of services) as for the first set of positions. The calculation module 40 then calculates the inter-cell interference value $I_{IC}^1$ for this set of positions (k=1) of the mobiles. The inter-cell interference values obtained so far are averaged, to yield a mean value $\bar{I}_{IC}$, and their standard deviation $\sigma_{IC}$ is calculated. This overall process continues, generating inter-cell interference values $I_{IC}^k$ for various different sets of positions of the mobiles, until the average inter-cell interference value $\bar{I}_{IC}$ has reached a stable value.

A controller 80 interacts with the positioning module 20 and the inter-cell calculation module 40 so as to control the overall operation of the system.

According to the preferred embodiment of the invention, the controller 80 assesses whether or not a stable $\bar{I}_{IC}$ value has been achieved, by computing the ratio of $\sigma_{IC}$ to $\bar{I}_{IC}$. When the value of this ratio is sufficiently low (i.e. $\sigma_{IC}$ is a certain fraction, a, or less of $\bar{I}_{IC}$) then this indicates that the current $\bar{I}_{IC}$ value is substantially independent of the positions of the mobiles. It is, thus, appropriate to use this current $\bar{I}_{IC}$ value as an indication of the inter-cell interference, and this value is output from the inter-cell interference evaluation system 10 as the evaluated inter-cell interference $I_{IC}$. Typically, a will take a value from 0.01 to 0.05 (i.e. 1 to 5%).

It will be seen that the inter-cell interference evaluation system 10 according to the preferred embodiment of the invention evaluates inter-cell interference via an iterative process. This is represented by a convergence loop $L_1$ (see FIG. 3).

In some cases the averaged inter-cell interference values for the different sets of mobiles' positions may not converge, or may converge too slowly. Accordingly, it is preferred to have a limit ($k_{max}$) on the total number of iterations in the convergence loop $L_1$. Thus, the iterative process stops when either:

$\sigma_{IC} \leq a \times \bar{I}_{IC}$, or $k \geq k_{max}$

Preferably, the calculation module 40 calculates the inter-cell interference value $I_{IC}^k$ for a given set of positions of the mobiles (represented by a particular value of the index variable k) via an iterative process. This is represented by convergence loop $L_2$ in FIG. 3 and will be described in more detail below.

According to the preferred embodiment of the invention, the calculation module 40 includes a power control module 50 which determines appropriate values for the transmission power $P_{i,0}$ of the different mobiles in the cell or sector for which inter-cell interference is being evaluated. This determination is based on an assessment of what is the total uplink interference $I_{ULtotal}$ experienced at the base station of the cell of interest. The assessment of total uplink interference assumes an initial value $I_{IC}^k=0$ for the inter-cell interference.

In order to simplify the overall evaluation process, power control is performed only for the cell under study (that is, the cell which is subject to the inter-cell interference which is being evaluated). A conversion module 60 allocates to the mobiles in the "interfering" cells, the same distribution of transmission power values as that which has been allocated to the mobiles in the cell under study.

Once transmission power values $P_{i,j}$ have been allocated to the interfering mobiles, a computing module 70 computes a value $I_{IC,0}^k$ for the inter-cell interference caused by these mobiles, taking into account path loss data produced by the path loss computing module 30. This value of inter-cell interference, $I_{IC,0}^k$, is then fed back to the power control module 50 and used in generating a fresh value, $I_{ULtotal}$, for the total uplink interference experienced in the cell of interest. This new value is used by the power control module 50 to produce updated transmission power values for the mobiles in the cell under study. These new transmission power values are then used by the conversion module 60 to produce transmission power values for the interfering mobiles. Next, the inter-cell interference computing module 70 produces a new value $I_{IC,1}^k$ for inter-cell interference based on these new transmission power values. And so on.

This iterative process continues until the inter-cell interference values $I_{IC,n}^k$ computed by the inter-cell interference computing module 70 have converged to a stable value. Preferably, the inter-cell interference computing module 70 determines whether or not convergence has occurred by assessing whether the difference between the present inter-cell interference value $I_{IC,n}^k$ and the last value, $I_{IC,n-1}^k$, is less than a certain fraction, b, of the last value, $I_{IC,n-1}^k$. Typically, b will take a value from 0.01 to 0.05 (i.e. 1 to 5%).

Once again, convergence may not always occur, or may occur too slowly. Accordingly, it is preferred to have a limit ($n_{max}$) on the total number of iterations in the convergence loop $L_2$. Thus, this iterative process stops when either:

$|I_{IC,n}^k - I_{IC,n-1}^k| \leq b \times I_{IC,n-1}^k$, or $n \geq n_{max}$

In the preferred embodiments of the invention, for each value $I_{IC,n}^k$ of inter-cell interference, the power control module 50 uses an iterative process to determine appropriate values for the transmission powers, $P_{i,0}$, of the mobiles in the cell under study. This iterative process is represented by convergence loop $L_3$ in FIG. 3.

According to the preferred embodiment of the invention, the power control module 50 computes an initial value $I_{ULtotal}$ for the total uplink interference experienced at the base station of the cell under study. In this computation it is initially assumed that inter-cell interference is zero (in other words $I_{IC}^k=0$) and that all mobiles in the considered cell or sector achieve their desired signal-to-interference ratios (CIR-target$_{UL,i}$). The power control module 50 then tries to assign transmission power values, within a range of $P_{min}$ to $P_{max}$, to the mobiles in this cell.

In general, it will not be possible to find transmission power values in the permitted range and which enable the desired signal-to-interference ratios (CIR-target$_{UL,i}$) of all the considered mobiles to be achieved. Accordingly, compromise values are set for at least some of the transmission powers/actual signal-to-interference ratios (CIR-target$_{UL,i}$). The power control module 50 computes a new value, $I_{ULtotal,0}$ for the total uplink interference in the cell/sector under study, taking into account the compromises that were necessary regarding the mobiles' transmission powers and signal-to-interference ratios (CIR-target$_{UL,i}$). New values are then computed for the transmission powers of the mobiles in the cell under study, based on this new value, $I_{U,total,0}$ for the total uplink interference. The power control module 50 computes a new value, $I_{ULtotal,1}$ for the total uplink interference in the cell under study, taking into account the new transmission power values assigned to the mobiles in the cell under study. And so on.

This iterative process continues until the total uplink interference values $I_{ULtotal,m}$ computed by the power control module 50 have converged to a stable value. Preferably, the power control module 50 determines whether or not convergence has occurred by assessing whether the difference between the present total uplink interference value, $I_{ULtotal,m}$, and the previous value, $I_{ULtotal,m-1}$ is less than a certain fraction, c, of the previous value, $I_{ULtotal,m-1}$. Typically, c will take a value from 0.01 to 0.05 (i.e. 1 to 5%).

Yet again, convergence may not always occur, or may occur too slowly. Accordingly, it is preferred to have a limit ($m_{max}$) on the total number of iterations in the convergence loop $L_3$. Thus, this iterative process stops when either:

$|I_{ULtotal,m} - I_{ULtotal,m-1}| \leq c \times I_{ULtotal,m-}$, or $m \geq m_{max}$ From the above it will be seen that the method of evaluating inter-cell interference according to the preferred embodiment of the present invention makes use of three nested convergence loops, represented in FIG. 3 by $L_1$, $L_2$ and $L_3$.

Now that the general structure of the system and method according to the preferred embodiment of the present invention have been described, greater detail will be provided on certain aspects thereof.

Positioning of Mobiles

The positioning module 20 has available to it data defining the total number of mobiles that should be positioned in each cell (each base station sector), and of the respective services to which these mobiles belong (the "service" information can be provided in the form of a probability density representing the probability that a given mobile in the sector will belong to a particular service). The data defining how many mobiles there are per sector, and their respective services, is typically input from outside the inter-cell interference evaluation system 10 (as shown in FIG. 2). This data can be channeled to the positioning module 20 via the controller 80 (as shown in FIG. 2) or provided directly to the positioning module 20.

Figure 4:
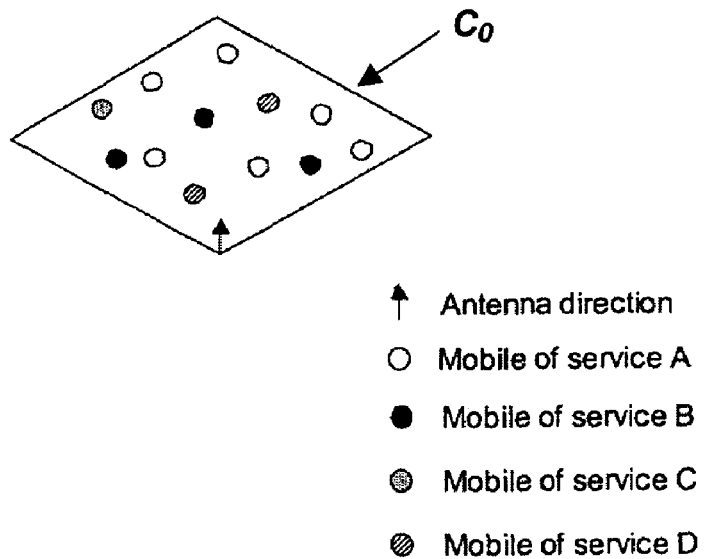
FIG. 4 is a diagram illustrating a simplified example of the distribution of mobiles within a cell $C_0$.

According to the preferred embodiment of the invention, the positioning module 20 first assigns positions to mobiles in one cell (normally the cell for which inter-cell interference is being evaluated—here, $C_0$), and then uses these assigned positions as the basis for allocating positions to the mobiles in the other cells (here, $C_i$). Preferably, the positioning module randomly assigns positions to the mobiles of the studied cell, $C_0$, so that the distribution of mobiles therein is uniform. FIG. 4 shows one simplified example of a distribution of mobiles, having four services (A to D), within a cell $C_0$. The number of sectors served by the base station of this cell is known to the mobile positioning unit 20 (either from pre-programming or via input data—typically input via the controller 80). The mobile positioning unit 20 preferably determines positions for mobiles in the other sectors (i.e. cells $C_1$, $C_2$) of this base station $BS_0$ by rotation: see FIG. 5 which shows the effect of rotations applied to the example mobile positions of FIG. 4. It can be considered that the various mobiles in these other sectors are images of respective mobiles in the studied sector (cell $C_0$) having the same position (distances, angles) relative to their sector and the same services as the respective corresponding mobiles in the studied sector.

Figure 5:
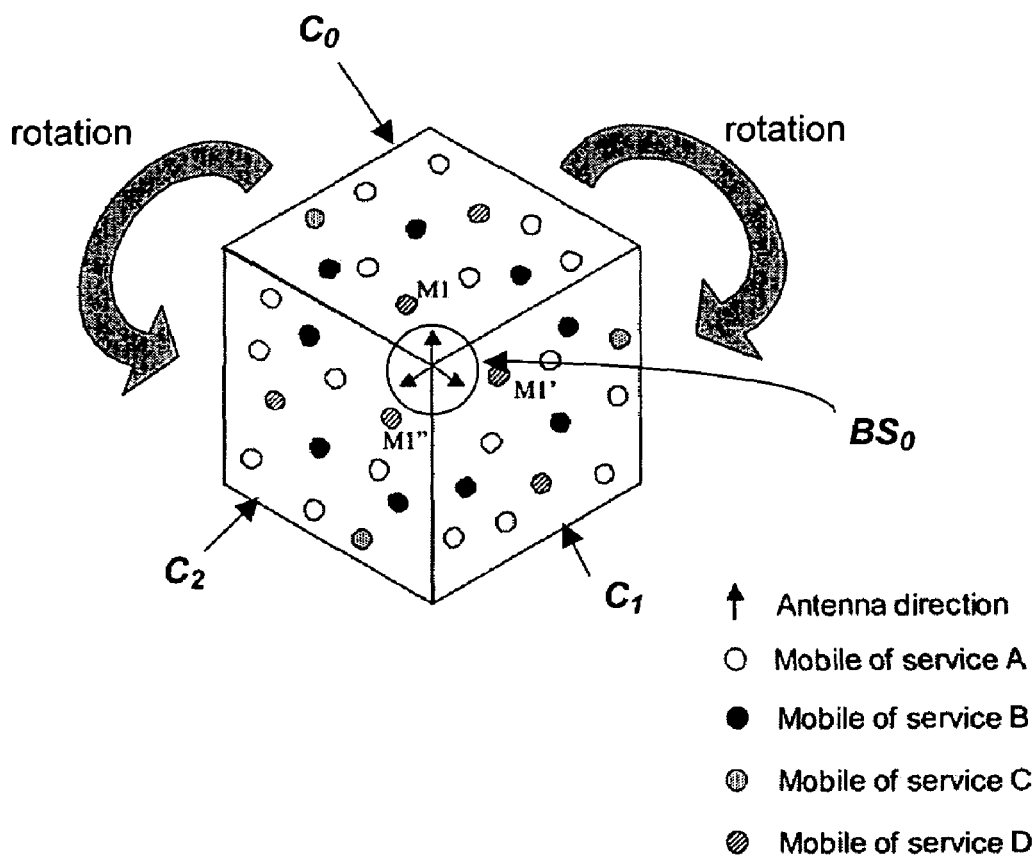
FIG. 5 is a diagram illustrating the positioning, by rotation, of mobiles in other sectors served by the same base station $BS_0$ as $C_0$, based on the example of FIG. 4.
Figure 6:
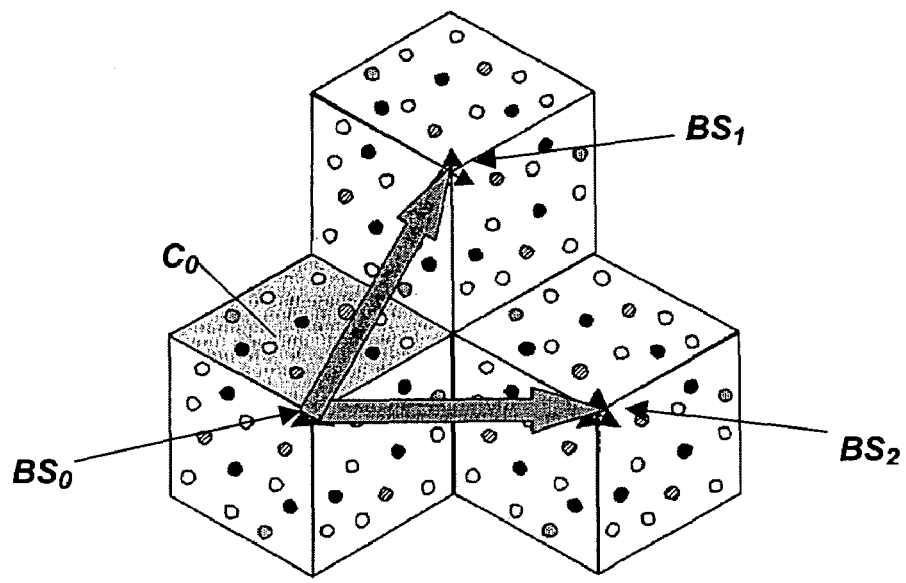
FIG. 6 is a diagram illustrating the positioning, by translation, of mobiles in cells served by base stations, $BS_i$, neighboring the base station $BS_0$, based on the example of FIGS. 4 and 5.
Figure 7:
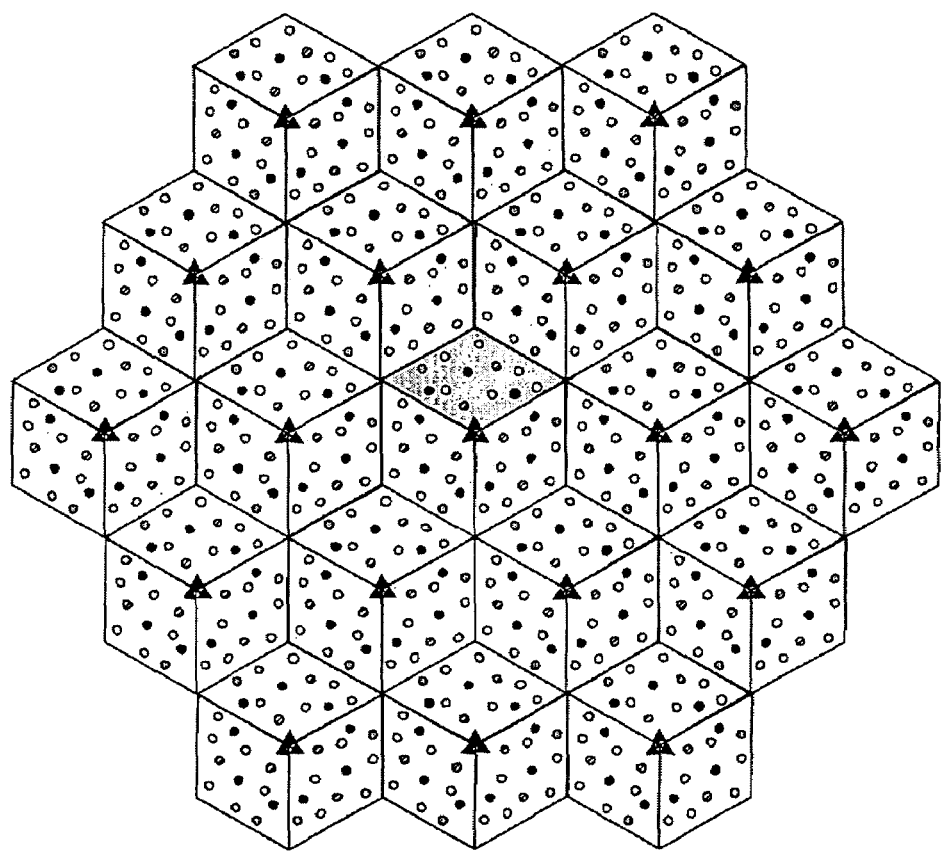
FIG. 7 is a diagram illustrating the positioning of mobiles within the cell $C_0$ and within cells served by the same base station and by two rings of nearest neighbor base stations, based on the example of FIGS. 4 to 6.

The distance between base stations in the network (and the angles therebetween) are known to the mobile positioning unit 20, once again either from pre-programming or via input data. So, when positions have been allocated to the mobiles in the cells, $C_0$, $C_1$ and $C_2$, served by the base station of interest, the positioning module 20 can allocate positions to mobiles in the other interfering cells, $C_3$, $C_4$, etc., by translating the positional distribution which holds for the cells of the base station $BS_0$. FIG. 6 illustrates how the positions of mobiles served by $BS_0$ (as shown in FIG. 5) can be translated to cells served by two neighboring base stations, $BS_1$ and $BS_2$. FIG. 7 illustrates the overall arrangement of mobiles resulting from the application of the above-described rotation and translation processes, according to the preferred embodiment of the invention, to the mobile positions of $C_0$ of FIG. 4. In FIG. 7, $C_0$ is indicated by shading.

Path Loss Computation

Path loss between a mobile and a receiving antenna is the attenuation, which occurs in the signal transmitted by the mobile to that antenna, due to propagation losses, and to physical gains and losses in the transmitter and receiver. Path loss also includes a power boost (or "power raise") factor which depends upon the service in which the mobile operates. Propagation losses depend on the distance between the mobile and the receiving antenna, on the angle between the mobile and the antenna's azimuthal angle, and on other factors which can be represented using a path loss model.

The path loss computing module 30 receives, from the positioning module 20, data indicating the positions of the mobiles in the various cells. The path loss computing module 30 has available to it (for example, by pre-programming) data indicating the location of the base station serving the cell under study. Accordingly, the path loss computing module can use standard trigonometric calculations to compute the distances and angles between each mobile and the studied cell's antenna. For example, the mobiles' positions can be expressed in polar coordinates with the position of the relevant base station antenna constituting the zero reference, which allows the distances and angles between each mobile and the studied cell to be directly deduced.

The path loss computing module 30 has available to it (for example, by pre-programming) data defining the path loss model (or "propagation model"), and data defining the antenna pattern at the base station of interest. In order to arrive at data, $PL_{i,j}$ defining the path loss between a given mobile i of cell j and the studied cell's antenna, the path loss computing module 30 uses known techniques to apply the propagation model and the antenna gain data to the computed distance and angle data, respectively. This initial path loss data, $PL_{i,j}$, for a given mobile can then be scaled so as to take into account the power raise applicable for the service in which this mobile is operating: yielding path loss data $PL'_{i,j}$. Typically, the path loss data $PL'_{i,j}$ for the current set (k) of mobile positions will be stored in a database.

Calculation of Uplink Inter-Cell Interference for a Given Set of Mobiles' Positions (k)

In the calculation module 40 according to the present embodiment, a value $I_{IC}^k$ is determined for the uplink inter-cell interference applicable in cell $C_0$ when the mobiles in cell $C_0$ and the neighboring interfering cells are in a set of positions indicated by an index variable k.

As mentioned above, the calculation of the uplink inter-cell interference $I_{IC}^k$ applicable for the set k of mobiles' positions involves a convergence loop, $L_2$, in which uplink power control is performed, followed by a computation of uplink inter-cell interference, followed by a fresh instance of power control, followed by a fresh computation of uplink inter-cell interference, and so on until the computed value of uplink inter-cell interference stabilizes.

According to the preferred embodiment of the invention, the computations of uplink inter-cell interference are based on the assumption that "image" mobiles in the interfering cells have the same transmission powers as the corresponding mobiles in the studied cell. In other words, uplink power control is only applied in the studied cell. In the neighboring cells the mobiles are the images of the studied cell's mobiles and so take the same transmission power values as those determined by the uplink power control process for the mobiles in the studied cell.

Figure 8:
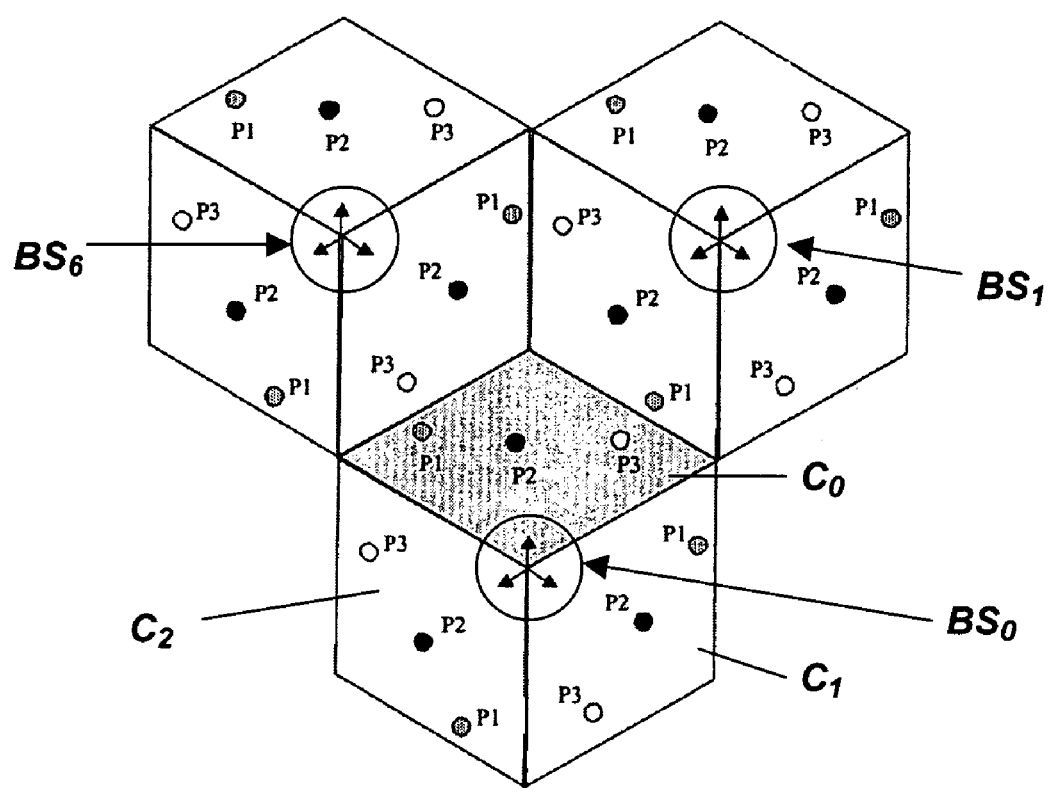
FIG. 8 is a diagram illustrating the transmission power values assigned to mobiles in $C_0$ and neighboring cells in a simplified example according to the preferred embodiment of the invention.

FIG. 8 illustrates this principle applied in a case where the "image" mobiles have been positioned by rotations and translations, as described above, based on an initial distribution of mobiles within one sector of a tri-sectored hexagonal network. In the highly-simplified example of FIG. 8, the studied sector (cell $C_0$) contains three mobiles of respective services A, B and C for which the uplink power control process assigns transmission powers $P_3$, $P_2$ and $P_1$, respectively. These transmission power values, $P_1$ to $P_3$, are allocated to the corresponding image mobiles in the neighboring cells, $C_i$.

The above-described assumption (that "image" mobiles have the same transmission power values of the corresponding mobiles in the studied cell) brings about a massive reduction in the complexity of the computation since, for example, uplink power control is only required in one cell instead of in 57 (in the case of tri-sectored base stations and interfering cells of two rings of base stations).

For each iteration of the convergence loop $L_2$, (i.e. for each value of the index variable, n), uplink inter-cell interference $I_{IC,n}^k$ is computed by the inter-cell interference computing module 70 taking into account path loss between the mobiles of the interfering cells (and sectors) and the studied cell's antenna, using the following formula:

$$I_{IC,n}^k = \sum_{i,j \neq 0} \frac{P_{i,j}}{PL'_{i,j}}$$

where $P_{i,j}$ is the transmission power of the $i^{th}$ mobile in the $j^{th}$ cell (the cell with index 0 being the studied cell and, as mentioned earlier $P_{i,j} = P_{i,0}$), and $PL'_{i,j}$ is the path loss between the $i^{th}$ mobile of the $j^{th}$ cell and the receiving antenna in the studied cell (taking into account the power raise applicable to the service in which this mobile is operating).

Uplink Power Control

As explained above, in the preferred embodiment of the invention uplink power control is applied in an iterative manner so as to determine a set of values $P_{i,0}$ for the transmission powers of the mobiles in the cell under study.

Uplink power control consists in determining appropriate transmission power values for each mobile in the studied cell in order to avoid the case where one mobile has excessively high power and can block the whole cell. The transmission powers of the mobiles are bounded between a minimum value $P_{min}$ and a maximum value $P_{max}$.

As indicated above, preferably uplink power control is implemented using a convergence loop, $L_3$, which seeks to arrive at a stable value for the total uplink interference $I_{ULtotal}$ received by the studied cell. Total uplink interference depends upon the uplink inter-cell interference, upon interference caused by the common channels, upon noise, and upon the transmission powers of the mobiles within the studied cell since transmissions by the latter cause intra-cell interference. On a given occasion when the convergence loop $L_3$ on total uplink interference $I_{ULtotal}$ runs, constant values are held for uplink inter-cell interference, interference caused by the common channels, and noise. Consequently, performing a convergence loop on $I_{ULtotal}$ amounts to performing a convergence loop on the transmission powers $P_{i,0}$ of the mobiles.

The power control module 50 preferably performs power control as follows.

First of all the value of $I_{ULtotal}$ is initialized based on a value, $Noise_{UL}$, for uplink noise power, a value, $I_{commonchannels,UL}$, for the interference generated by the common channels, a value, $I_{IC}^k$, for inter-cell interference, and values, $CIR\text{-}target_{UL,i}$, for the target signal-to-interference ratios for each mobile of the studied cell. As mentioned above, $Noise_{UL}$, $I_{commonchannels,UL}$ and $I_{IC}^k$ are fixed for one power control operation (i.e. one complete running of the convergence loop $L_3$). The initial value of $I_{ULtotal}$ is calculated, based on the assumption that all mobiles of the studied cell can reach their targeted signal-to-interference ratios, according to the following equation:

$$I_{ULtotal} = \frac{I_{IC}^k + Noise_{UL} + I_{commonchannels,UL}}{1 - \sum_i \left( \frac{CIR - target_{UL,i}}{1 + CIR - target_{UL,i}} \right)}$$

When an initial value has been found for $I_{ULtotal}$, the power control module 50 next computes values for the respective transmission powers, $P_{i,0}$, of the various mobiles in the studied cell, according to the following equation:

$$P_{i,0} = \frac{CIR - target_{UL,i}}{1 + CIR - target_{UL,i}} \times I_{ULtotal} \times PL'_{i,0}$$

where $PL'_{i,0}$ is the path loss between the ith mobile and the receiving antenna (scaled so as to take into account the power raise of the ith mobile, which depends upon the service in which that mobile operates).

However, transmission powers of the mobiles can only be within the range of $P_{min}$ to $P_{max}$. If the computed transmission power value for the ith mobile falls outside the permitted range (notably, it is too high), then $P_{i,0}$ will be limited for this mobile and it will not attain its desired signal-to-interference value.

The power control module 50 calculates a new value, $I_{ULtotal,m}$, for the total uplink interference, based on the computed transmission power values, according to the following equation:

$$I_{ULtotal,m} = \sum_i \frac{P_{i,0}}{PL'_{i,0}} + I_{IC}^k + Noise_{UL} + I_{commonchannels,UL}$$

This new value, $I_{ULtotal,m}$, will be different from the initial value, $I_{ULtotal}$, if there is at least one mobile which has had its power limited/cannot attain its target signal-to-interference ratio.

The power control module 50 tests the new value for total uplink interference, $I_{ULtotal,m}$, to see whether or not there has been convergence upon a stable value. As mentioned above, this test preferably consists in determining whether the difference between the new value for total uplink interference and the previous value for total uplink interference is less than a certain fraction, c, (which may, for example, be ⅟₅₀) of the previous value. If the total uplink interference has not converged on a stable value then the power control module 50 repeats the steps of computing new power values for the mobiles, re-calculating the total uplink interference and testing the newly-computed value for total uplink interference. If the total uplink interference has converged on a stable value then the power control module 50 sets the latest-computed values of transmission power data, $P_{i,0}$, as the definitive values to be used for the next iteration in the computation of inter-cell interference for the present set (k) of positions of the mobiles.

In order to keep down the duration of the iterative process involved in convergence loop $L_3$, the power control module 50 is preferably pre-programmed with a value $m_{max}$ indicating the maximum number of iterations that should be performed when seeking to find a stable value of $I_{ULtotal}$. If this maximum number of iterations has been performed, the latest-computed power values, $P_{i,0}$ are output for use by the conversion module 60 and inter-cell interference computing module 70 regardless of whether or not the difference between the new value of total uplink interference, $I_{ULtotal,m}$, and the previous value, $I_{ULtotal,m-1}$, is larger or smaller than $c \times I_{ULtotal,m-1}$.

Although there have been described above certain preferred embodiments of a system and method for evaluating inter-cell interference, it is to be understood that the present invention is not limited by the detailed features and particularities noted in the description, except as otherwise specified in the claims. More particularly, the skilled person will readily appreciate that numerous modifications and adaptations can be made in the detailed implementation of the present invention.

For example, in the uplink inter-cell interference evaluation system of the above-described preferred embodiment, various functions are split between different system components (notably, the controller 80, the positioning module 20, the path loss computing module 30, the calculation module 40, etc.). However, it is to be understood that the split of functions could be made differently: for example, the inter-cell interference computing module 70 (rather than the controller 80) could calculate $\bar{I}_{IC}$ and $\sigma_{IC}$, and make the determination as to whether or not the convergence loop $L_1$ has yet produced a stable value for $I_{IC}$. Similarly, although according to the above description it is the path loss computing module 30 which scales path loss values so as to take into account power raise related to the mobiles service, this scaling could be performed in the power control module 50 and inter-cell interference computing module 70 (or in a separate module provided for this purpose).

Moreover, in many implementations of the present invention it may not be possible to separate out discrete elements which perform the respective functions which, above, have been ascribed to the different modules of FIG. 2. Various of the modules may be merged into common units.

In addition, the various modules making up the uplink inter-cell interference evaluation system shown in FIG. 2 do not necessarily represent physical devices. The corresponding functions can, and generally will, be implemented in software.

Furthermore, in the specific embodiments discussed above, particular equations are applied in order to determine whether or not there is a sufficient degree of convergence in a convergence loop. However, it will be readily understood by the skilled person that convergence can be judged using a number of different criteria: the invention is not limited with reference to the criteria that can be applied in order to determine whether a sufficient degree of convergence has been achieved.

What is claimed is:

1. In a cellular mobile communications system comprising at least a first cell and a set of second cells, with mobile communications units in said first cell and second cells and the mobile communications units in said set of second cells being susceptible of causing interference affecting said mobile communications units of the first cell, a method of evaluating uplink inter-cell interference affecting mobile communications units in said first cell, the method comprising the steps of:
   a) allocating positions of mobile communications units within said first cell ($C_0$);
   b) allocating positions of mobile communications units within said set of second cells ($C_i$);
   c) calculating a value ($I_{IC}^k$) for uplink inter-cell interference applicable to said mobile communications units in said first cell based on the set (k) of mobile communications unit positions allocated, in the allocating steps, to mobile communications units of said first and second cells;
   d) repeating steps a) to c) for different sets (k) of positions of the mobile communications units, until a first predetermined criterion is satisfied; and
   e) determining, as the value of uplink inter-cell interference ($I_{IC}$), the mean or median of the values calculated in the different occurrences of step c).

2. The method of evaluating uplink inter-cell interference according to claim 1, wherein said first predetermined criterion is that either the ratio of the standard deviation ($\sigma_{IC}$) of the inter-cell interference values ($I_{IC}^k$) calculated in the different occurrences of step c) to the mean ($I_{IC}$) of said inter-cell interference values ($I_{IC}^k$) is less than a threshold amount (a), or there have been a predetermined number ($k_{max}$) of repetitions of steps a) to c).

3. The method of evaluating uplink inter-cell interference according to claim 1, in a cellular mobile communications system having base stations, each base station serving a respective region, and said first cell ($C_0$) being in a first region served by a first base station ($BS_0$), wherein position-allocating step b) comprises allocating to the mobile communications units of second cells served by base stations ($BS_i$) other than said first base station ($BS_0$) the same positional distribution within their respective regions as that of the mobile communications units within the first region.

4. The method of evaluating uplink inter-cell interference according to claim 1, in a cellular mobile communications system having sectorized base stations, each base station serving a respective region defined by a plurality of sectors, each sector corresponding to a cell, and said first cell ($C_0$) being in a region served by a first base station ($BS_0$), wherein position-allocating step b) comprises allocating positions to mobile communications units within second cells ($C_1$, $C_2$) served by the first base station ($BS_0$) by rotation of the positions of the mobile communications units in said first cell ($C_0$).

5. The method of evaluating uplink inter-cell interference according to claim 1, and further comprising the step of:
   f) determining path loss from the mobile communications units of the second cells and a base station antenna of the first cell.

6. The method of evaluating uplink inter-cell interference according to claim 5, wherein calculating step c) comprises the sub-steps of:

g) allocating a distribution of transmission power values for the mobile communications units of the first cell;

h) allocating a distribution of transmission power values for the mobile communications units of the second cells;

i) determining, based on the allocated distributions of transmission power values, a value ($I_{IC}, n^k$) for uplink inter-cell interference affecting said mobile communications units of the first cell;

j) repeating steps g) to i) for different distributions of transmission power values, until a second predetermined criterion is satisfied; and k) determining, as the value ($I_{IC}^k$) of uplink inter-dell interference for this set (k) of positions of the mobile communications units, the value ($I_{IC}, n^k$) calculated in the last repetition of step i).

7. The method of evaluating uplink inter-cell interference according to claim 6, wherein said second predetermined criterion is that either the change ($|I_{IC}, n^{k} - I_{IC}, n - I^k|$) in inter-cell interference from one occurrence of steps g) to i) to the next is less than a specified fraction (b) of the inter-cell interference value ($I_{IC,n-I}^k$) determined in said one occurrence of steps g) to i), or there have been a predetermined number ($n_{max}$) of repetitions of steps g) to i).

8. The method of evaluating uplink inter-cell interference according to claim 6, wherein the power-distribution allocating step g) comprises the steps of:

α) determining a value for the total uplink interference experienced by said mobile communications units in said first cell ($C_0$);

β) computing values, within a permitted range ($P_{min}$ to $P_{max}$), for transmission power of said mobile communications units of said first cell, based on said determined value for total uplink interference;

χ) calculating a new value ($I_{ULtotal,m}$) of said total uplink interference, based on the transmission power values computed in said computing step, and determining whether or not a third criterion is satisfied;

δ) if the third criterion is not satisfied, repeating steps β) and χ) until the third criterion is satisfied, wherein in each repeated occurrence of step β) the computation is based on the new value ($I_{ULtotal,m}$) of said total uplink interference calculated in the preceding occurrence of step χ); and ε) when the third criterion is satisfied, using as the transmission power values ($P_{i,0}$) for the mobile communications units in said first set the values computed in the last repetition of step β).

9. The method of evaluating uplink inter-cell interference according to claim 8, wherein the third criterion is that either the change ($|I_{ULtotal,m} - I_{ULtotal,m-1}|$) in the calculated value of total uplink interference from one occurrence of step χ) to the next is less than a specified fraction (c) of the total uplink interference value determined in said one occurrence of step χ), or there have been a predetermined number ($m_{max}$) of repetitions of steps β) and χ).

10. The method of evaluating uplink inter-cell interference according to claim 6, in a cellular mobile communications system having base stations, each base station serving a respective region, and said first cell ($C_0$) being in a first region served by a first base station ($BS_0$), wherein the transmission-power allocating steps comprise allocating to the mobile communications units served by base stations ($BS_i$) other than said first base station ($BS_0$) the same distribution of transmission power values within their respective regions as that determined for the mobile communications units served by the first base station ($BS_0$).

11. An uplink inter-cell interference evaluation system for evaluating the uplink inter-cell interference affecting mobile communications units in a first cell of a cellular mobile communications system, said cellular mobile communications system comprising mobile communications units of a set of second cells susceptible of causing interference affecting said mobile communications units of the first cell, the system comprising:

a positioning module for allocating positions of mobile communications units within said first cell ($C_0$) and said set of second cells ($C_i$); and an inter-cell interference computing module for calculating a value ($I_{IC}^k$) for uplink inter-cell interference applicable to said mobile communications units in said first cell based on the set (k) of mobile communications unit positions allocated, in the allocating steps, to mobile communications units of said first cell and of said second set of cells;

wherein the positioning module and the inter-cell interference computing module are arranged to implement a first convergence loop ($L_I$) in which uplink inter-cell interference values ($I_{IC}^k$) continue to be produced, for respective different sets of positions (k) of the mobile communications units, until a first predetermined criterion is satisfied; and the mean ($\bar{I}_{IC}$) or median of said uplink inter-cell interference values ($I_{IC}^k$) produced by said first convergence loop ($L_I$) constitutes the uplink inter-cell interference ($I_{IC}$) evaluated by the system.

12. The uplink inter-cell interference evaluation system according to claim 11, wherein said first predetermined criterion is that either the ratio of the standard deviation ($\sigma_{IC}$) of the said uplink inter-cell interference values ($I_{IC}^k$) to the mean ($\bar{I}_{IC}$) of said uplink inter-cell interference values ($I_{IC}^k$) is less than a threshold amount (a), or a predetermined number of said uplink inter-cell interference values ($I_{IC}^k$) have been calculated in the first convergence loop ($L_i$).

13. The uplink inter-cell interference evaluation system according to claim 11, for evaluating uplink inter-cell interference in a cellular mobile communications system having base stations, each base station serving a respective region, and said first cell ($C_0$) being in a first region served by a first base station ($BS_0$), wherein the positioning module is adapted to allocate to the mobile communications units of second cells served by base stations ($BS_i$) other than said first base station ($BS_0$) the same positional distribution within their respective region as that of the mobile communications units within the first region.

14. The uplink inter-cell interference evaluation system according to claim 11, for evaluating uplink inter-cell interference in a cellular mobile communications system having sectorized base stations, each base station serving a respective region defined by a plurality of sectors, each sector corresponding to a cell, and said first cell ($C_0$) being in a region served by a first base station ($BS_0$), wherein the positioning module is adapted to allocate positions to mobile communications units within second cells served by said first base station ($BS_0$) by rotation of the positions of the mobile communications units in said first cell ($C_0$).

15. The uplink inter-cell interference evaluation system according to claim 11, and further comprising a path loss computing module for computing path loss between said mobile communications units of the second cells ($C_i$) and a base station antenna of the first cell ($C_0$).

16. The uplink inter-cell interference evaluation system according to claim 15 and comprising transmission-power allocating means for allocating respective distributions of transmission power values for the mobile communications units of the first and second cells; wherein:

the inter-cell interference computing module is adapted to calculate a value ($I_{IC}^k$) for uplink inter-cell interference, based on the set (n) of transmission-power distributions allocated by the transmission-power allocating means;

the transmission-power allocating means and the inter-cell interference computing module are arranged to implement a second convergence loop ($L_2$) in which uplink inter-cell interference values ($I_{IC}^k$) continue to be produced, for respective different sets (n) of transmission-power distributions of the mobile communications units, until a second predetermined criterion is satisfied; and the uplink inter-cell interference value ($I_{IC}^k$) produced by the second convergence loop ($L_2$) when the second criterion is satisfied constitutes the uplink inter-cell interference value ($I_{IC}^k$) computed by the computing module for the current set (k) of positions of the mobile communications units.

17. The uplink inter-cell interference evaluation system according to claim 16, wherein said second predetermined criterion is that either the difference between the last uplink inter-cell interference value ($I_{IC}^k$) calculated by the uplink inter-cell interference computing module and the previous calculated uplink inter-cell interference value ($I_{IC,n-1}^k$) is less than a specified fraction (b) of said previous calculated uplink inter-cell interference value ($I_{IC,n-1}^k$), or there have been a predetermined number ($n_{max}$) of iterations in the convergence loop ($L_2$).

18. The uplink inter-cell interference evaluation system according to claim 16, wherein, in use, in order to arrive at a suitable distribution of transmission-power values for the mobile communications units of the first cell, the transmission-power allocating means:

determines a value for the total uplink interference experienced by said mobile communications units in said first cell ($C_0$); and iteratively, until a third criterion is satisfied:

computes values, within a permitted range $P_{min}$ to $P_{max}$, for transmission power of said mobile communications units of the first cell, based on said total uplink interference value, and calculates a new value ($I_{ULtotal,m}$) of said total uplink interference, based on the computed transmission power values, wherein when the third criterion is satisfied, the last-computed transmission power values ($P_{i,0}$) are allocated to the mobile communications units in said first cell ($C_0$).

19. The uplink inter-cell interference evaluation system according to claim 18, wherein the third criterion is that either the difference between the last calculated value ($I_{ULtotal,m}$) of total uplink interference and the previous calculated value ($I_{ULtotal,m-1}$) of total uplink interference is less than a specified fraction (c) of said previous calculated value of total uplink interference, or there have been a predetermined number ($m_{max}$) of iterations.

20. The uplink inter-cell interference evaluation system according to claim 16, for evaluating uplink inter-cell interference in a cellular mobile communications system having base stations, each base station serving a respective region, and said first cell ($C_0$) being in a first region served by a first base station ($BS_0$), wherein the transmission-power allocating means is adapted to apply power control for the mobile communications units of the first cell ($C_0$) only, and to allocate to the mobile communications units of the second cells ($C_i$) the same distribution of transmission power values as that determined for the first region.

21. A computer program having a set of instructions which, when in use on a general purpose computer, cause the computer to perform the steps of the method of claim 1.

* * * * *